United States Patent Office 3,634,427
Patented Jan. 11, 1972

3,634,427
[1]BENZOTHIENO[2,3-d]PYRIMIDINE
DERIVATIVES
Ernst Schweizer, Basel, and Paul Schmidt and Kurt Eichenberger, Therwil, Switzerland, assignors to Ciba Corporation, Summit, N.J.
No Drawing. Filed July 8, 1969, Ser. No. 840,035
Claims priority, application Switzerland, July 15, 1968, 10,522/68; June 5, 1969, 8,651/69
Int. Cl. C07d 99/06
U.S. Cl. 260—256.5 R                14 Claims

ABSTRACT OF THE DISCLOSURE

Compounds of the formula

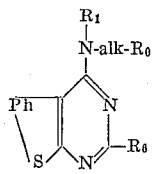

in which Ph stands for an optionally substituted phenylene radical, $R_0$ for an optionally substituted amino group, $R_1$ for hydrogen or alkyl and $R_6$ for hydrogen or an optionally substituted hydrocarbon radical, and their 5,6,7,8-tetrahydro derivatives are useful as antiparasitary agents. The new starting materials also form an embodiment of the invention.

SUMMARY OF THE DISCLOSURE

The present invention relates to new [1]benzothieno-[2,3-d]pyrimidine derivatives. Especially it concerns [1]benzothieno[2,3-d]pyrimidines containing the nucleus of the formula

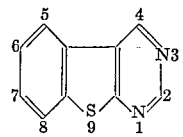

and its 5,6,7,8-tetrahydro derivatives containing the nucleus of the formula

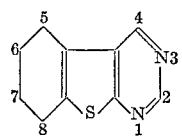

all of which carry on the carbocycle at least one aromatic carbocyclic residue and contain an amino-lower alkylamino group in the 4-position, and their salts, as well as pharmaceutical compositions containing these compounds and a process for treating malaria or diseases caused by amoebae consisting in administering such compositions to a warm-blooded being.

The terminal amino group of the aminoalkylamino group in the 4-position may be unsubstituted or substituted. A substituted amino group is preferably an aliphatic amino group, that is to say an amino group which is monosubstituted or disubstituted by residues of aliphatic character. Herein residues of aliphatic character are above all aliphatic hydrocarbon radicals. Accordingly the following may be mentioned as substituents of a terminal secondary or tertiary amino group: lower hydrocarbon residues of aliphatic character which may also be interrupted by hetero atoms such as oxygen, sulphur or nitrogen atoms in the carbon chain and/or substituted, for example by hydroxyl groups lower hydrocarbon residues of aliphatic character acting as substituents of the terminal amino group are above all the following residues having at most 8 carbon atoms: alkyl, alkenyl or alkylene residues. Residues of this nature interrupted by heteroatoms are above all oxaalkylene, azalkylene or thiaalkylene residues. As substituents of the terminal amino group there should especially be mentioned methyl, ethyl, allyl, propyl, isopropyl, methallyl, straight-chain or branched butyl, pentyl, hexyl or heptyl residues bonded in any desired position, 2-hydroxyethyl, 3-hydroxypropyl, butylene-(1,4), pentylene-(1,5), hexylene-(1,5), hexylene-(1,6), hexylene-(2,5), heptylene-(1,7), heptylene-(2,7), heptylene-(2,6), 3-oxapentylene-(1,5), 3-thiapentylene-(1,5), 2,4-dimethyl-3-thiapentylene-(1,5), 2-azapentylene-(1,5), 3-lower alkyl-3-azapentylene-(1,5), such as 3-methyl-3-aza - pentylene - (1,5), 3-(hydroxy-lower alkyl)-3-azapentylene-(1,5), such as 3-(β-hydroxyethyl)-3-aza-pentylene-(1,5), 3-oxahexylene-(1,6) or 3-azahexylene-(1,6) residues.

In the amino-lower alkylamino group in the 4-position the lower alkylene residue which joins the two nitrogen atoms is especially a straight-chain or branched alkylene residue having preferably at most 6 carbon atoms which separates the two nitrogen atoms by 2 to 5, preferably 2 to 3, above all 2, carbon atoms, such as an ethylene-(1,2), propylene-(1,3), butylene-(1,4), pentylene-(1,5), pentylene-(2,5), butylene-(2,4), propylene-(1,2), propylene-(2,3) or butylene-(3,4) residue.

In the aminoalkylamino group mentioned a substituent of the amino group may also be bonded to the alkylene residue which joins the two nitrogen atoms.

The nitrogen atom of the aminoalkylamino group located on the pyrimidine ring is preferably unsubstituted but can however also be substituted, for example by a lower alkyl residue such as one of those mentioned.

The aminoalkylamino group in the 4-position is especially a mono-lower alkylamino-lower alkylamino group or above all a di-lower alkylamino-lower alkylamino group, a pyrrolidino- or piperidino-lower alkylamino group which is optionally C-lower alkylated in the ring and/or β-singly unsaturated in the ring, a piperazino-, N'-lower alkyl-piperazino or N'-(hydroxy-lower alkyl)-piperazino-, thiomorpholino- or morpholino-lower alkylamino group which is optionally C-lower alkylated in the ring, or an N-lower alkylpyrrolidinyl-2- or 3-lower alkylamino group or N-lower alkylpiperidyl-2-, 3- or 4-lower alkylamino group, it also being possible for the nitrogen atom located on the pyrimidine nucleus to be further substituted by a lower alkyl residue and hence to be tertiary.

The aromatic carbocyclic residue attached to the carbocycle of the benzothienopyrimidine nucleus is more especially a phenyl residue which may be unsubstituted or substituted. Preferably it is in 6- or 8-position or in 7-position. As especially suitable substituents of aromatic carbocyclic residues there may be mentioned lower alkyl groups, for example those mentioned below, lower alkoxy residues such as methoxy, ethoxy, propoxy or butoxy residues, methylenedioxy groups, halogen atoms such as fluorine, chlorine or bromine atoms, trifluoromethyl groups, hydroxyl groups, nitro groups, amino groups, acyloxy or acylamino groups, in which the acyl residues are those of saturated carboxylic acids preferably containing no more than 8 carbon atoms, especially lower alkanoic acids such as acetic, propionic or butyric acid, or phenyl-lower alkanoic acids such as benzoic acids or phenylacetic acids which may be substituted, for example as indicated above for the aromatic carbocyclic residues.

The new compounds may contain further substituents. Thus, especially on the carbocycle of the benzothienopyrimidine nucleus, they may contain apart from the above-mentioned aromatic carbocyclic residue further substituents, that is to say that the new compounds may contain one or, as the case may be, two substituents in each of the positions 5,6,7 and/or 8. As the above-mentioned further substituents there are suitable, for example, optionally substituted hydrocarbon residues. Particularly suitable are alkyl groups, such as lower alkyl groups, in the first place those containing 1–6 carbon atoms, such as methyl, ethyl, propyl, isopropyl; linear or branched butyl, pentyl or hexyl residues linked in any desired position; or aromatic carbocyclic residues of the type mentioned above, or aralkyl residues, especially benzyl, phenylethyl or phenylpropyl residues whose aromatic portion may be substituted, for example as indicated for the aromatic carbocyclic residues.

In the first place the above-mentioned further substituents are aromatic carbocyclic residues.

A preferred group of the new compounds comprises those compounds which contain in the 6- and/or 8-position two aromatic carbocyclic residues, especially optionally substituted phenyl residues. Preferably, one each of the residues mentioned is in position 6 and 8. Likewise important are the 5,6,7,8-tetrahydro[1]benzothieno[2,3]pyrimidines which carry in 7-position two aromatic carbocyclic residues.

Furthermore, the new compounds may also be substituted in position 2, especially by optionally substituted hydrocarbon residues, for example lower alkyl or aralkyl residues, for example those mentioned above, or lower alkenyl residues, for example allyl or methallyl residues, lower cycloalkyl or cycloalkyl-alkyl residues such as cyclopropyl, cyclobutyl, cyclopentyl or cyclohexyl residues, or cyclopropyl-, cyclobutyl-, cyclopentyl-, cyclohexyl-, cycloheptyl-methyl, -ethyl or -propyl residues.

The new compounds possess valuable pharmacological properties, above all an anti-bacterial and anti-parasitary action. Thus they especially exhibit an action against plasmodia, for example *Plasmodium berghei*, as is found in animal experiments, for example on oral administration of 4×100 to 300 mg./kg. (administered on 4 successive days) to albino mice. The new compounds are also active against strains of plasmodia which are resistant to other anti-malaria agents, as for example primaquine. The new compounds are therefore useful as chemotherapeutics against malaria and also, in particular, as prophylactics against that disease. Furthermore, as can be shown in animal experiments, for example on oral administration of 100 to 200 mg./kg. to hamsters infected with *E. histolytica*, they have an amoebicidal effect and are therefore useful as amoebicides. In addition they possess an anti-inflammatory action.

The new compounds are however also valuable intermediates for the manufacture of other useful substances, especially of pharmacologically active compounds.

Special mention is deserved by the compounds of the formulae

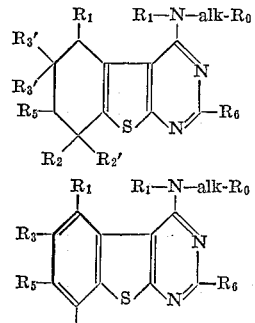

(Ia)

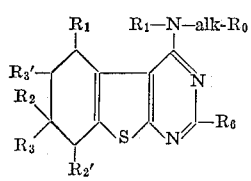

(Ib)

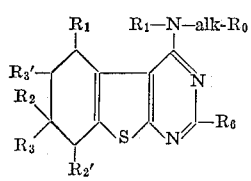

(Ic)

in which alk represents a linear or branched lower alkylene radical which separates $R_0$ from the nitrogen atom in the 4-position of 2 to 5, especially by 2 or 3 carbon atoms; $R_0$ represents a mono-lower alkylamino or especially a di-lower alkylamino or a lower alkyleneamino, oxaalkylene-amino, azaalkylene-amino or thiaalkylene-amino group, such as a piperidino or pyrrolidino group which may be mono-unsaturated in $\beta$-position and/or C-lower alkylated, or a possibly C-lower alkylated morpholino, thiomorpholino, piperazino, N'-lower alkyl-piperazino or N'-(hydroxy-lower alkyl)-piperazino group such as N'-methyl-piperazino or N'-($\beta$-hydroxyethyl)-piperazino group; $R_1$ represents a lower alkyl residue or especially a hydrogen atom; one of the residues $R_2$ and $R_3$ is a phenyl residue which may be substituted, for example as shown above, and the other, as well as the residues $R_2'$ and $R_3'$ may be identical or different, and represent lower alkyl groups, phenyl-lower alkyl or phenyl residues which may be substituted, for example as indicated, or hydrogen atoms, $R_2'$ and $R_3'$ preferably being hydrogen atoms and $R_2$ and $R_3$ each is a phenyl residue which may be substituted, for example as indicated above; $R_4$ and $R_5$ each represents a lower alkyl residue or especially a hydrogen atom; $R_6$ represents a lower alkyl group, a phenyl-lower alkyl, such as benzyl or phenylethyl residue, which may be substituted, for example, as indicated, or especially a hydrogen atom, and especially those compounds of the Formulae Ia, Ib, and Ic, in which $R_0$, $R_1$, $R_4$, $R_5$ and $R_6$ have the above meanings, $R_2'$ and $R_3'$ are hydrogen atoms and $R_2$ and $R_3$, which may be identical or different, represents phenyl residues which may be substituted by one, two or more lower alkyl groups, trifluoromethyl firoups and/or especially lower alkoxy groups and/or primarily by halogen atoms, for example bromine or especially chlorine atoms, and preferably at least one substituent is in the para-position.

Special mention because of their good antimalarial effect is deserved by the compounds of the formulae

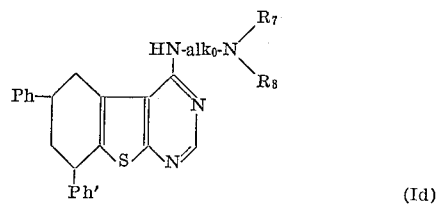

(Id)

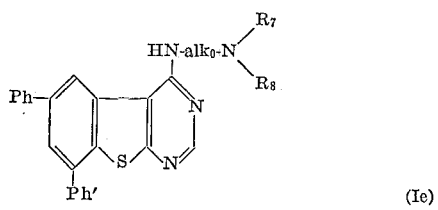

(Ie)

and

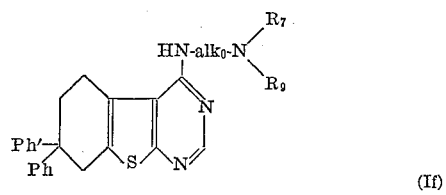

(If)

in which Ph and Ph' each represents a phenyl residue substituted by one, two or more lower alkoxy groups and/or halogen atoms, especially chlorine atoms; alk represents a linear or branched lower alkylene residue which separates the two nitrogen atoms by 2 to 5, especially 2 or 3 carbon atoms; $R_7$ and $R_8$ each represents a lower alkyl residue, and especially those compounds of the Formulae I*d*, I*e* and I*f*, in which Ph and Ph' each is a phenyl residue which may be substituted, especially in the para-position, by lower alkyl groups, lower alkoxy groups such as especially methoxy, or in the first place by halogen, especially chlorine atoms; alk₀ stands for ethylene-(1,2) or propylene-(1,3) residues; $R_7$ and $R_8$ each is ethyl or especially methyl, and more especially 4-(β-diethylaminoethylamino) - 6,8 - bis - (para-chlorophenyl)-5,6,7,8-tetrahydro[1]benzothieno[2,3-d]pyrimidine, 4-β-(diethylaminoethylamino) - 6,8 - diphenyl - 5,6,7,8-tetrahydro[1]-benzothieno[2,3-d]pyrimidine and in the first place 4-(β-dimethylaminoethylamino) - 6,8-bis-(para-chlorophenyl)-5,6,7,8 - tetrahydro[1]benzothieno[2,3 - d]pyrimidine which, for example in the form of its hydrochloride (pH about 5) on oral administration to albino mice on 4 consecutive days in doses of 100 mg./kg. each (referred to the free base) produces a distinct antimalarial effect.

Likewise important are compounds of the formulae

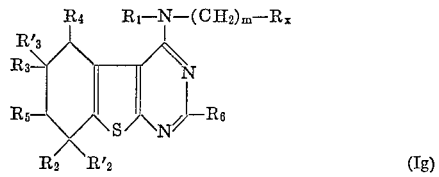

(Ig)

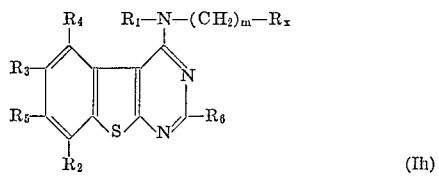

(Ih)

and

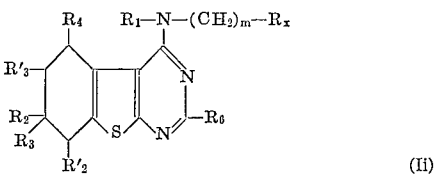

(Ii)

in which $R_1$, $R_2$, $R_2'$, $R_3$, $R_3'$, $R_4$, $R_5$ and $R_6$ have the above general and preferred meanings, $m$ is 1 or 2, and $R_x$ represents an N-lower alkyl-pyrrolidinyl-2- or 3-residue or an N-lower alkyl-piperidinyl-2, -3 or -4-residue.

The new compounds are accessible by known methods.

According to a preferred method a 4-Y-[1]benzothieno-[2,3-d]pyrimidine, which carries on the carbocycle at least one aromatic carbocyclic residue and in which Y represents a halogen atom, such as a bromine or especially a chlorine atom, or a 5,6,7,8-tetrahydro derivative thereof, is reacted with an appropriate amino-lower alkylamine having at least one hydrogen atom on one nitrogen atom.

The reaction is effected in the usual manner, appropriately at elevated temperature; if desired, an excess of amino-lower alkylamine may be used. The reaction can be effected in the presence or absence of a diluent, optionally in a closed vessel under pressure and/or in an inert gas atmosphere.

The new compounds may also be obtained when a 4-Y₀-[1]benzothieno[2,3-d]pyrimidine, which carries on the carbocycle at least one aromatic carbocyclic residue and in which Y₀ represents a reactive esterified hydroxy-lower alkylamino group, or a 5,6,7,8-tetrahydro derivative thereof is reacted with ammonia or an amine which has at least one hydrogen atom at the nitrogen atom.

A reactive esterified hydroxyl group is therein for example a hydroxyl group esterified with a hydrohalic acid, such as hydrochloric or hydrobromic acid, or with an arylsulphonic acid such as benzenesulphonic, p-bromobenzenesulphonic or p-toluenesulphonic acid.

The reaction takes place in the usual manner, preferably in the presence of a solvent and advantageously in the presence of a condensation agent such as a basic agent.

The new compounds in which at least one amino group carries at least one hydrogen atom at the nitrogen atom may also be obtained when in a 4-Yₓ-[1]benzothieno[2,3-d]pyrimidine, which carries on the carbocycle at least one aromatic carbocyclic residue and in which Yₓ represents a corresponding amino-lower alkylamino group carrying on at least one nitrogen atom an α-aralkyl group, such as a benzyl group, or in a 5,6,7,8-tetrahydro derivative thereof, the α-aralkyl group is split off by hydrogenolysis.

The hydrogenolysis is carried out, for example, by reduction with catalytically activated hydrogen such as hydrogen in the presence of a hydrogenation catalyst such as a palladium or platinum catalyst.

The reaction mentioned takes place in the usual manner, at ordinary temperature or elevated temperature advantageously in the presence of solvents and/or diluents.

Substituents may be introduced, converted or split off in the resulting compounds within the framework of the definition of the end substances.

Thus, for example, in resulting 4-(amino-lower alkylamino)-[1]benzothieno[2,3-d]pyrimidines or in 5,6,7,8-tetrahydro derivatives thereof which carry on the carbocycle at least one aromatic carbocyclic residue and which have at least one hydrogen atom at the nitrogen atom in the 4-position or at the nitrogen atom of the terminal amino group of the amino-lower alkylamino group, it is possible to substitute these amino groups, for example by the substituents mentioned for the 4-amino-lower alkylamino group.

The substitution is for example effected by reaction with a reactive ester of a corresponding alcohol or by means of an epoxide. The reactive esters are especially those with hydrohalic acids, such as hydrochloric, hydrobromic or hydriodic acid, sulphuric acid or arylsulphonic acids, such as benzenesulphonic, p-bromobenzenesulphonic or p-toluenesulphonic acid. The reaction takes place in the usual manner, advantageously in the presence of a basic condensation agent.

The substitution of the above-mentioned amino groups can however also be effected reductively, for example by reaction with a corresponding oxo compound such as a corresponding aldehyde or ketone, and subsequent or simultaneous reduction of the condensation product thus obtained. The oxo compound mentioned can also be employed in the form of its reactive functional oxo derivatives such as acetals, acylals, end-ethers or enol-esters. The reduction takes place in the usual manner, for example with hydrogen in the presence of a catalyst such as a platinum, palladium or nickel catalyst, or also with formic acid. A Schiff base obtained as the condensation product can also be reduced by means of a di-light metal hydride such as for example an alkali metal-earth metal hydride such as sodium borohydride or lithium aluminium hydride.

The reactions mentioned are effected in the usual manner, advantageously under the conditions known for analogous reactions.

In resulting compounds which contain free hydroxyl groups on an aromatic residue, such hydroxyl groups may be etherified or acylated. The acylation takes place in the usual manner, for example by reaction with a halide, especially the chloride, or an anhydride of a carboxylic acid. The etherification takes place in the usual manner, for example by reaction with an alkyl halide, such as chloride, bromide or iodide, or a dialkyl sulfate, preferably in the presence of a strong base.

In resulting compounds which contain an acylated hydroxyl group, the latter can be split to give the free hydroxyl group. Acylated hydroxyl groups are for example those mentioned above. The splitting off is for example effected hydrolytically, catalysed by acids or bases, for example with sodium hydroxide solution, as appropriate.

In resulting compounds which possess alkoxy residues on an aromatic ring, such residues can be converted into free hydroxyl groups in the usual manner. This conversion is for example effected by hydrolysis, above all by means of strong acids, such as for example hydriodic acid or hydrobromic acid and optionally in the presence of light metal halides such as aluminium bromide or boron bromide, or also with pyridine hydrochloride or aluminium chloride in pyridine.

In resulting compounds which contain aryl residues capable of nitration, the latter may be nitrated. The nitration is effected in a manner which is in itself known, for example by treatment with a mixture of concentrated sulphuric acid and concentrated nitric acid or with the mixed anhydride of nitric acid and a carboxylic acid, for example a lower alkanecarboxylic acid such as acetic acid.

In resulting compounds which contain nitroaryl residues, the latter can be reduced to aminoaryl residues, for example by means of iron and hydrochloric acid or by means of catalytically activated hydrogen such as hydrogen in the presence of a hydrogenation catalyst, for example a platinum, nickel or palladium catalyst, such as platinum oxide, Raney nickel or palladium charcoal.

In resulting compounds which possess amino groups on aromatic residues, such groups can be acylated. The acylation is for example effected by reaction with a halide, especially the chloride or an anhydride of a carboxylic acid.

Acyl residues in a resulting acylamino compound can be eliminated in the usual manner, for example by hydrolysis, preferably in the presence of an acidic or basic catalyst.

These subsequent reactions may be performed singly or in combinations and in any desired order of sequence.

Depending on the starting materials and reaction conditions used the final products are obtained in free form or in the form of their acid additions salts which are likewise included in this invention. Thus, for example, basic, neutral or mixed salts, possibly also hemi-, mono-, sesqui- or polyhydrates thereof may be obtained. The acid addition salts of the new compounds may be converted into the free compound in known manner, for example with basic reagents such as alkalies or ion exchange resins. On the other hand, the resulting free bases may form salts with organic or inorganic acids. The acid addition salts are preferably manufactured with acids capable of forming therapeutically acceptable salts, for example hydrohalic acids, sulphuric or phosphoric acids, nitric acid, perchloric acid, or aliphatic, alicyclic, aromatic or heterocyclic carboxylic or sulphonic acids such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicylic or p-aminosalicylic acid, embonic, methanesulphonic, ethanesulphonic, hydroxyethanesulphonic, ethylenesulphonic acid; halobenzenesulphonic, toluenesulphonic, naphthalenesulphonic or sulphanilic acid; methionine, tryptophan, lysine or arginine.

The above-mentioned or other salts of the new compounds, for example their picrates, may also be used for purifying the resulting free bases by converting the bases into salts, isolating the salts and liberating the bases from them again. In view of the close relationship between the new compounds in free form and in form of their salts what has been said above and hereinafter with reference to the free compounds concerns also the corresponding salts wherever suitable and possible.

Depending on the starting materials and reaction conditions employed the new compounds are obtained as optical antipodes, racemates or isomer mixtures (racemate mixtures).

A resulting isomer mixture (racemate mixture) can be resolved into the stereoisomeric (diastereomeric) pure isomers (racemates) by making use of the physico-chemical differences between the ingredients, for example by chromatography and/or fractional crystallization.

Resulting racemates can be resolved into the diastereomers by known methods, for example by recrystallization from an optically active solvent, or with the aid of microorganisms or by reaction with an optically active acid that forms salts with the racemic compound and separation of the salts thus obtained, for example by utilizing their different solubilities, and from the diastereomers the antipodes can be liberated by treatment with suitable reagents. Preferred optically active acids are, for example, the D- and L-forms of tartaric acid, di-o-toluyltartaric acid, malic acid, mandelic acid, camphorsulphonic or quinic acid. It is advantageous to isolate the more active of the two antipodes.

If during the reaction isomerization occurs it is possible, if desired, to repeat the separation, for example as described above, after the reaction.

The invention includes also any variant of the process in which an intermeidate obtained at any stage of the process is used as starting material and any remaining process steps are carried out or the process is discontinued at any stage thereof, or in which a starting material is formed under the reaction conditions or a reactant is used in form of a salt thereof.

The reactions according to this invention are advantageously carried out with starting materials that furnish the group of final products specifically mentioned above and more especially the final products specifically described or emphasized above.

The starting materials are known or, insofar as they are new, they are accessible by known methods.

Thus, for example, the 4-halogeno-[1]benzothieno[2,3-d]pyrimidines and the corresponding 5,6,7,8-tetrahydro derivatives, preferably used as starting materials, which carry on the carbocycle at least one aromatic carbocyclic residue, are obtained when in a 4-hydroxy-[1]benzothieno[2,3-d]pyrimidine or in a 5,6,7,8-tetrahydro derivative thereof, which carries on the carbocycle at least one aromatic carbocyclic residue, the hydroxyl group is converted into a halogen atom.

The hydroxyl group is converted into a halogen atom in known manner, for example by treatment with a halide of sulphur or preferably phosphorus, for example phosphorus pentachloride, oxychloride or trichloride or the corresponding bromides. The reaction is carried out in the usual manner, if desired or required in the presence of a tertiary base, such as triethylamine or dimethylaniline.

The 4-hydroxy-[1]benzothieno[2,3-d]pyrimidines and the corresponding 5,6,7,8-tetrahydro derivatives containing on the carbocycle at least one aromatic carbocyclic residue, are obtained when a 2-amino-3-Z''-6,7-dihydro- or 4,5,6,7-tetrahydrobenzo[b]thiophene, which contains at least one aromatic carbocyclic or heterocyclic residue on the carbocycle and in which Z'' represents a free carboxyl group or a functionally converted carboxyl group containing an oxo group, for example an esterified carboxyl group such as a carboalkoxy or carbamyl group, is reacted with a reactive acid derivative of a carboxylic acid capable of pyrimidine cyclization, such as an ester, amide, a halide (e.g. the chloride), iminoether, anhydride or a nitrile, with the proviso that at least the residue Z'' or the functionally converted carboxyl group of the said carboxylic acid contains a nitrogen atom.

If a 6,7-dihydro compound is used as a starting material, the carbocycle is aromatized during the intramolecular condensation and a 4-hydroxy-[1]benzothieno[2,3-d]pyrimidine obtained. From the 4,5,6,7-tetrahydro compounds the 4-hydroxy-5,6,7,8-tetrahydro[1]benzothieno[2,3-d]-pyrimidines are obtained.

The 2-amino-3-Y''-6,7-dihydro- or 4,5,6,7-tetrahydrobenzo[b]thiophenes, which contain on the carbocycle at least one aromatic carbocyclic residue and in which Y'' represents a free or functionally converted carboxyl group, for example a group Z'' or a nitrile group, are obtained when a cyclohexanone, which may contain a double bond in 5,6-position and which contains in one of the positions 3 to 6 at least one aromatic carbocyclic residue as substituent and which is unsubstituted in 2-position, is reacted with a compound of the formula Y''—CH$_2$—C≡N in which Y'' has the above meaning and simultaneously or subsequently with sulfur.

The reaction is carried out in the usual manner, advantageously in the presence of a solvent such as a polar solvent, for example a lower alkanol such as methanol or ethanol, or dimethylformamide, and preferably in the presence of a basic condensing agent such as an organic base, for example diethylamine, triethylamine, piperidine or morpholine, at room temperature or with slight heating and, if desired, in nitrogen and/or under superatmospheric pressure.

In a resulting compound substituents may be introduced, modified or eliminated.

Thus, for example, in a resulting 2-amino-3-Y'''-6,7-dihydro- or -4,5,6,7-tetrahydro-benzo[b]thiophene substituents Y'' may be converted one into the other.

Cyano groups may be converted in the usual manner into carbamyl or carboxyl groups, for example by hydrolysis, such as hydrolysis in the presence of a strong base, such as an alkali metal hydroxide, for instance potassium or sodium hydroxide, or in the presence of a strong acid, for example a mineral acid such as hydrochloric acid, and if desired, with the addition of an oxidant such as nitrous acid.

Esterified carboxyl and carbamyl groups may be converted into free carboxyl groups in the usual manner, for example by hydrolysis, preferably in the presence of a strong base or strong acid, for example those mentioned above. If desired, the hydrolysis of carbamyl groups may be performed in the presence of an oxidant such as nitrous acid.

Cyano groups may also be converted into esterified carboxyl groups in the usual manner, for example by alcoholysis such as reaction with a suitable alcohol in the presence of a mineral acid, such as sulphuric acid, and advantageously in the presence of ammonium chloride.

Free or esterified carboxyl groups may be converted into carbamyl groups in the usual manner, for example by reaction with ammonia and, if necessary, dehydration of the intermediately formed ammonium salt.

Free carboxyl groups can be esterified in the usual manner, for example by reaction with a suitable alcohol, advantageously in the presence of an acid, such as a mineral acid, for example sulphuric or hydrochloric acid, or by reaction with a suitable diazo compound, for example a diazoalkane.

Free carboxyl groups may also be converted, for example in the usual manner, into acid halide or acid anhydride groupings, for example by reaction with halides of phosphorus or sulphur such as thionylchloride, phosphorus pentachloride or tribromide, or with acid halides such as chloroformic acid esters. The acid anhydride or halide groups may then be converted in the usual manner, by reaction with suitable alcohols, if desired in the presence of said acceptors such as organic or inorganic bases, or with ammonia, into esterified carboxyl groups or carbamyl groups respectively.

Compounds containing a free carboxyl group may be obtained in free form or in the form of their salts with bases. A resulting free acid compound can be converted in the usual manner, for example by reaction with a suitable basic agent, into its salts with bases, especially therapeutically acceptable salts with bases, for example salts with organic amines, or into metal salts. Especially suitable metal salts are alkali or alkaline earth metal salts such as sodium, potassium, magnesium or calcium salts. From the salts the free acids can be formed, in the usual manner, for example by reaction with acid reagents. The salts may also be used for purifying the new compounds, for instance by converting the free compounds into salts thereof, isolating the salts and converting them again into the free compounds.

If desired, in resulting compounds the conversions described above for substituents on aromatic residues may be performed in a similar manner.

The separation of possibly obtained racemate mixtures and/or racemates may be carried out as described above.

Compounds containing basic groups may result in free form or in the form of their acid addition salts. Free compounds and salts may be converted into one another as described above.

The new starting materials, especially those comprising the [1]benzothieno[2,3-d]pyrimidine or the benzo[b]thiophene structure possess valuable properties and are likewise included in the present invention.

Thus, for example, the corresponding 2-amino-3-Y''-6,7-dihydro- or -4,5,6,7-tetrahydro-benzo[b]thiophenes, which carry on the carbocycle at least one aromatic carbocyclic residue and in which Y'' represents a free or functionally modified carboxyl group, have an antiphlogistic effect and may therefore be used as anti-inflammatory drugs. Furthermore, they lower the blood pressure.

A functionally modified carboxyl group is more especially a cyano group, an esterified carboxyl group or a carbamyl group.

An esterified carboxyl group is primarily a carboxyl group esterified with an aliphatic alcohol such as a lower alkanol or alkenol, for example methanol, ethanol, propanol, isopropanol, allyl alcohol, methallyl alcohol, butanol, secondary butanol, isobutanol or amyl alcohol, or with a cycloaliphatic alcohol such as a cycloalkanol, for example cyclopentanol or cyclohexanol, with a cycloaliphatic-aliphatic alcohol such as a cycloalkyl-lower alkanol, for example a cyclopentyl- or cyclohexyl-methanol, -ethanol or -propanol, or with an araliphatic alcohol such as a benzyl alcohol or 1- or 2-phenylethanol whose aromatic nucleus may be substituted. As substituents of the aromatic residue there are suitable in the first place lower alkyls, for example methyl, ethyl, propyl, isopropyl, butyl, isobutyl or amyl residues, lower alkoxy groups, for example methoxy, ethoxy, propoxy, isopropoxy, butoxy or amyloxy groups, halogen atoms, for example fluorine, chlorine or brominne atoms, and/or trifluoromethyl groups.

Specially valuable are the compounds of the general formulae

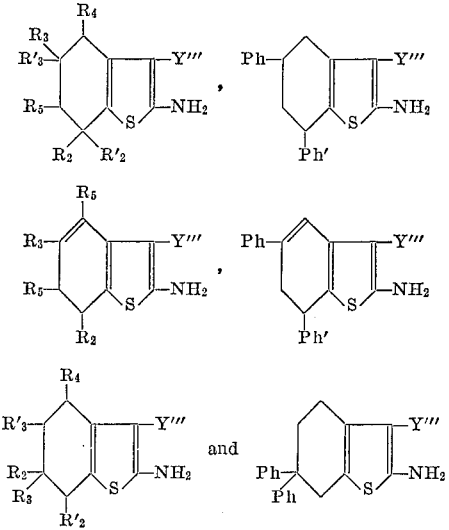

in which $R_2$, $R_2'$, $R_3$, $R_3'$, $R_4$, $R_5$, Ph and Ph' have the above-defined meanings and Y''' represents a free carboxyl group, the nitrile, carbamyl or especially a lower carbalkoxy group, especially the carbomethoxy or carbethoxy group, and especially 2-amino-3-carbethoxy-5,7-diphenyl-4,5,6,7-tetrahydro-benzo[b]thiophene.

The corresponding 4-halogeno-5,6,7,8-tetrahydro[1]benzo-thieno[2,3-d]pyrimidines, which contain on the carbocycle at least one aromatic carbocyclic residue and in which the 4-halogen atom is preferably a bromine atom or especially a chlorine atom, display a bactericidal and a fungicidal activity and may be used as bactericides and fungicides.

Specially valuable are in this connection the compounds of the general formulae

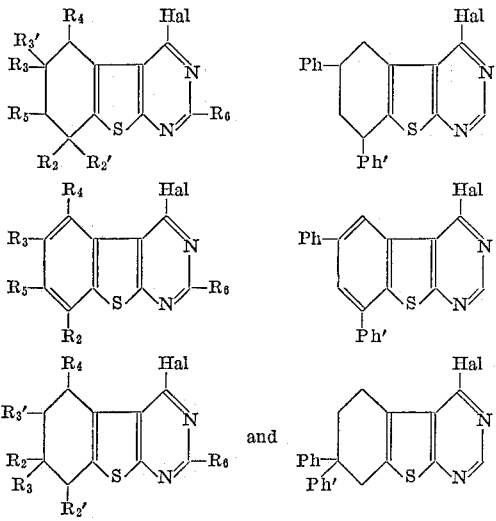

in which $R_2$, $R_2'$, $R_3$, $R_3'$, $R_4$, $R_5$, $R_6$, Ph and Ph' have the above defined meanings and Hal stands for bromine or especially for chlorine, and especially 4-chloro-6,8-diphenyl - 5,6,7,8 - tetrahydro[1]benzothieno[2,3-d]pyrimidine.

The pharmacologically active compounds may be used, for example, in the form of pharmaceutical preparations containing them in free form or in form of their salts, especially of therapeutically acceptable salts, in conjunction or admixture with an organic or inorganic, solid or liquid pharmaceutical excipient suitable, for example, for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragees, capsules or suppositories, or in liquid form solutions (for example elixirs or syrups), suspensions or emulsions. They may be sterilized and/or may contain assistants such as preserving, stabilizing, wetting or emulsifying agents, solubilizers, salts for regulating the osmotic pressure, or buffers. They may also contain further therapeutically valuable substances. The pharmaceutical preparations are formulated by known methods.

The new compounds may also be used in the form of animal fodder or additives to animal fodder, using, for example, the conventional extenders and diluents and fodders respectively.

The compounds that have a bacterial or fungicidal activity may be used as disinfectants or preservatives, for example for disinfecting the skin, instruments, bandages, underwear or the like, and also for disinfecting or preserving victuals or animal fodder. They may be applied as such or in the form of mixtures with the usual extenders or excipients.

The following examples illustrate the invention.

Example 1

A mixture of 9 g. of 4-chloro-6,8-diphenyl-5,6,7,8-tetrahydro-[1]benzothieno[2,3-d]pyrimidine and 25 ml. of β-diethyl-amino-ethylamine is heated for 2 hours at 140° C. While still warm, the reaction mixture is stirred into ice water, the crystals are suctioned off and recrystallized from methanol. 4 - (β-diethylaminoethylamino)- 6,8 - diphenyl - 5,6,7,8-tetrahydro[1]benzothieno[2,3-d] pyrimidine of the formula

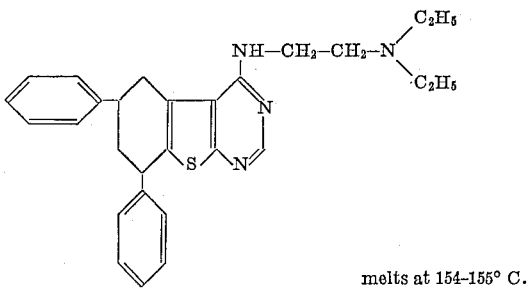

melts at 154–155° C.

The 4-chloro-6,8-diphenyl-5,6,7,8-tetrahydro[1]benzothieno[2,3-d]pyrimidine used as starting material may be prepared thus:

21 grams of 3,5-diphenyl-cyclohexanone, 9.5 g. of ethyl cyanoacetate and 2.8 g. of powdered sulphur are suspended in 30 ml. of absolute ethanol, 8 ml. of morpholine are dropped in and the whole is stirred on for 4 hours at 40° C., during which gradual dissolution occurs and a precipitate of 2-amino-3-carbethoxy-5,7-diphenyl-4,5,6,7-tetrahydrobenzo[b]thiophene forms which is suctioned off and recrystallized from ethanol. The product melts at 156–157° C.

16.5 grams of 2 - amino - 3 - carbethoxy - 5,7 - diphenyl - 4,5,6,7 - tetrahydrobenzo[b]thiophene and 50 ml. of formamide are heated for 8 hours at 180° C. On cooling, 4 - hydroxy - 6,8 - diphenyl - 5,6,7,8 - tetrahydro[1] benzothieno[2,3 - d]pyrimidine crystallizes out. On recrystallization from aqueous dimethylformamide it melts at 255–256° C.

A mixture of 20 g. of 4 - hydroxy - 6,8 - diphenyl-5,6,7,8 - tetrahydro[1]benzothieno[2,3 - d]pyrimidine, 50 ml. of phosphorus oxychloride and 4 g. of triethylamine is heated for 1 hour under reflux. The excess phosphorus oxychloride is distilled off, the residue taken up in methylenechloride and this solution is stirred into ammoniacal ice water. The organic phase is isolated, dried and evaporated. The residue is recrystallized from ethanol and yields 4 -chloro - 6,8 - diphenyl - 5,6,7,8 - tetrahydro[1] benzothieno[2,3 - d]pyrimidine melting at 150–151° C.

A mixture of 8 g. of 4 - chloro - 6,8 - diphenyl - 5,6,7,8-tetrahydro[1]benzothieno[2,3 - d]pyrimidine and 25 ml. of γ-dimethylaminopropylamine is heated for 2 hours at 140° C. The excess amine is then distilled off under reduced pressure and the residue is digested with water and suctioned off. The resulting 4 - (γ - dimethylamonopropylamino) - 6,8 - diphenyl - 5,6,7,8 - tetrahydro[1]benzothieno[2,3-d]pyrimidine of the formula

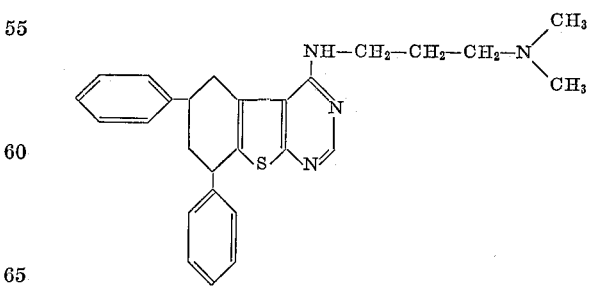

is dissolved in isopropanol. Hydrogen chloride gas is introduced to precipitate the dihydrochloride which melts at 256° C. after recrystallisation from ethanol.

An analogous reaction of 4 - chloro - 6,8 - bis - (p-chlorophenyl) - 5,6,7,8 - tetrahydro[1]benzothieno[2,3-d]pyrimidine furnishes 4 - (β - diethylaminoethylamino)- 6,8 - bis - (p - chlorophenyl) - 5,6,7,8 - tetrahydro[1] benzothieno[2,3 - d]pyrimidine and 4 - (β - dimethylaminoethylamino - 6,8 - bis - (p-chlorophenyl) - 5,6,7,8- tetrahydro[1]benzothieno[2,3 - d]pyrimidine and their hydrochlorides respectively.

Example 3

A mixture of 9 g. of 4 - chloro - 6,8 - diphenyl - 5,6,7,8-tetrahydro - [1]benzothieno[2,3 - d]pyrimidine and 25 ml. of 4 - amino - 1 - (diethylamino) - pentane is heated for 2 hours at 180° C. The hot oil is poured into 100 ml. of ice water, whereupon crystallization sets in. After a few hours the base is suctioned off, dissolved in isopropanol and dry hydrochloric gas is introduced into the solution. 4 - (4 - diethylamino - 1 - methyl - butylamino) - 6,8-diphenyl - 5,6,7,8 - tetrahydro - [1]benzothieno[2,3 - d] pyrimidine dihydrochloride of the formula

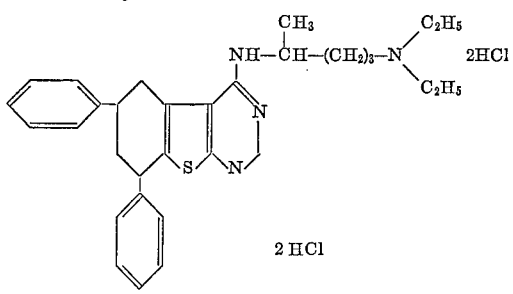

precipitates and can be recrystallized from isopropanol; it melts at 225–230° C.

EXAMPLE 4

A mixture of 4.5 g. of 4 - chloro - 6,8 - bis - (p - chlorophenyl) - 5,6,7,8 - tetrahydro[1]benzothieno[2,3 - d]pyrimidine and 25 ml. of β - diethylamino - ethylamine is heated for 1 hour at 140° C. The excess amine is then distilled off, and the crystalline residue suspended in water, suctioned off and recrystallized from aqueous ethanol. 4 - (β - diethylaminoethylamino) - 6,8 - bis - (p-chlorophenyl) - 5,6,7,8 - tetrahydro[1]benzothieno[2,3-d]pyrimidine of the formula

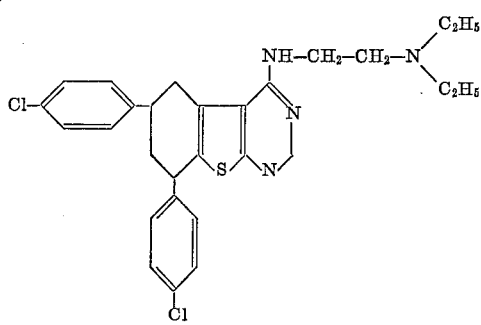

melts at 172–174° C.

The 4 - chloro - 6,8 - bis - (p - chlorophenyl) - 5,6,7,8-tetrahydro[1]benzothieno[2,3-d]pyrimidine used as starting material may be manufactured thus:

A mixture of 114 g. of 4,4'-dichlorochalcone, 75 g. of acetoacetic acid ester, 350 ml. of ethanol and 9.9 g. of sodium is condensed to furnish 1,5 - bis - (p - chlorophenyl) - 4 - carbethoxycyclohexen - (3) - one, melting at 117–118° C., by being boiled for 8 hours 70 grams of this compound are boiled with 250 ml. of 2 N-hydrochloric acid for 4 hours at 160° C., whereupon hydrolysis and decarboxylation yielding 1,5 - bis - (p-chlorophenyl) - cyclohexen - (3) - one [melting at 109–111° C. after recrystallization from ethanol] occur.

47 grams of this cyclohexenone are dissolved in 500 ml. of dioxan and hydrogenated with 5 g. of palladium carbon (10% Pd). The solvent is distilled off and the residue chromatographed on alumina. Elution with methylenechloride furnishes 3,5 - bis - (p - chlorophenyl) - cyclohexanone melting at 103–105° C.

20 grams of this compound together with 7.1 g. of ethyl cyanoacetate and 2 g. of sulfur are suspended in 50 ml. of ethanol, 6 ml. of morpholine are dropped in and the whole is stirred for 6 hours at 40–50° C. during which everything dissolves. On cooling, 2 - amino - 3 - carbethoxy-5,7 - bis - (p -chlorophenyl) - 4,5,6,7 - tetrahydrobenzo [b]thiophene crystallizes out; it is suctioned off and recrystallized from ethanol and melts at 155–156° C.

8 grams of this compound are heated under nitrogen for 6 hours at 180° C. with formamide; at first, a solution forms, which clears after a short time and towards the end of the reaction 4-hydroxy-6,8-bis-(p-chlorophenyl) - 5,6,7,8 - tetrahydro - [1]benzothieno[2,3-d]pyrimidine, melting at 260–263° C., settles out. 6.5 grams of this product are suspended in 30 ml. of phosphorus oxychloride, at room temperature 1 g. of triethylamine is added and the whole is refluxed for 1 hour. The excess phosphorus oxychloride is distilled off, the residue taken up in methylenechloride and this solution is stirred into ammoniacal ice water. The organic phase is separated, dried and evaporated. The residue is recrystallized from ethanol and yields 4-chloro-6,8-bis-(p-chlorophenyl)-5,6,7,8-tetrahydro[1]benzothieno[2,3-d]pyrimidine melting at 170–172° C.

Example 5

10 g. of 4-chloro-6,8-bis-(para-chlorophenyl)-5,6,7,8-tetrahydro-[1]benzothieno[2,3-d]pyrimidine and 50 ml. of β-dimethylaminoethylamine are heated together at 140° C. for 1 hour. The excess amine is then distilled off, the the crystalline residue suspended in water, filtered with suction and recrystallized from aqueous ethanol. 4-(β-dimethylaminoethylamino)-6,8-bis-(para - chlorophenyl)-5,6,7,8-tetrahydro-[1]benzothieno[2,3-d]pyrimidine of the formula

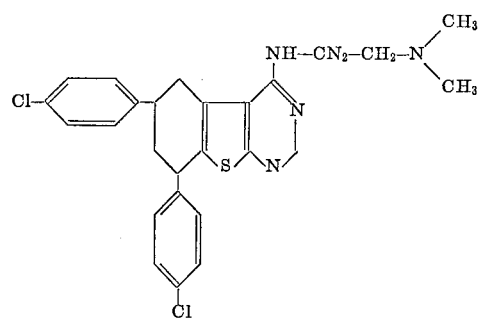

melts at 199–200° C. The dihydrochloride of this compound melts at 236–238° C.

Example 6

3.6 g. of 4-chloro-6,8-diphenyl-5,6,7,8-tetrahydro-[1] benzothieno[2,3-d]pyrimidine and 30 ml. of β-morpholinoethylamine are heated together at 190° C. for 1 hour. The excess amine is distilled off under reduced pressure, the crystalline residue suspended in ethanol and filtered with suction. The resulting 4-(β-morpholinoethylamino)-6,8-diphenyl - 5,6,7,8 - tetrahydro-[1]benzothieno[2,3-d] pyrimidine of the formula

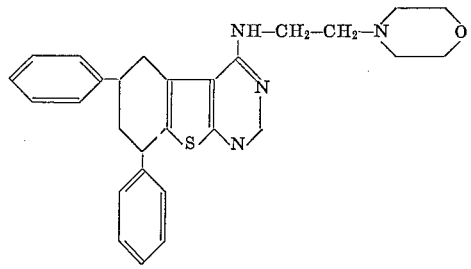

melts at 182–184° C.

Example 7

7 g. of 4-chloro-6,8-bis-(para-chlorophenyl)-5,6,7,8-tetrahydro-[1]benzothieno[2,3-d]pyrimidine and 40 ml. of γ-dimethylaminopropylamine are heated together at 140° C. for 1 hour. After that the excess amine is distilled off, the crystalline residue suspended in water, filtered with suction, and recrystallized from aqueous ethanol. 4-(γ - dimethylaminopropylamino)-6,8-bis-(para-chlorophenyl) - 5,6,7,8 - tetrahydro[1]benzothieno[2,3-d]pyrimidine of the formula

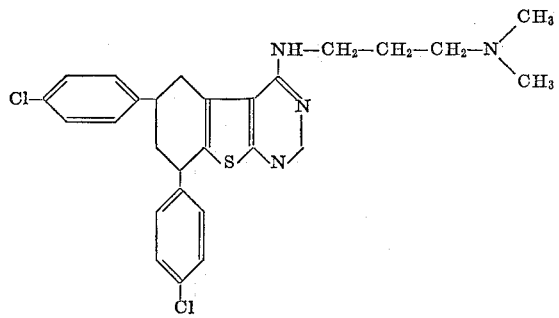

melts at 175–176° C.

Example 8

8.3 g. of 4-chloro - 6,8 - bis(para-chlorophenyl)-[1]benzothieno[2,3-d]pyrimidine and 25 ml. of β-dimethyl-aminoethylamine are heated together at 140° C. for 1 hour. The excess amine is then distilled off, the residue suspended in water, filtered with suction, and recrystallized from dimethylformamide. 4-(β-dimethylaminoethylamino) - 6,8 - bis - (para-chlorophenyl)-[1]benzothieno-[2,3-d]pyrimidine of the formula

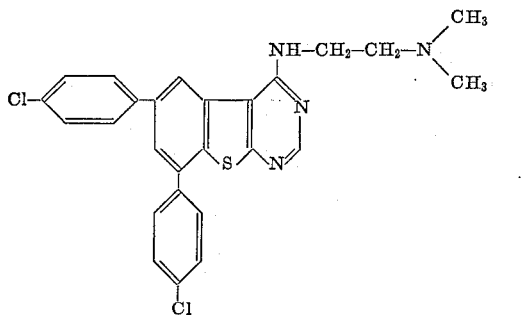

melts at 202–203° C.

The 4-chloro-6,8-bis-(para-chlorophenyl) - [1]benzothieno[2,3-d]pyrimidine used as starting material can be prepared as follows:

15.8 g. of 1,5-bis(para-chlorophenyl)-cyclohexenone-3 are suspended in 20 ml. of ethanol together with 5.7 g. of ethyl cyanoacetate and 1.6 g. of sulfur. 5 ml. of morpholine are added dropwise and the mixture stirred at 40–50° C. for 6 hours, complete dissolution occurring. On cooling, 2-amino - 3 - carbethoxy-5,7-bis-(parachlorophenyl)-6,7-dihydro-benzo[b]thiophene of the formula

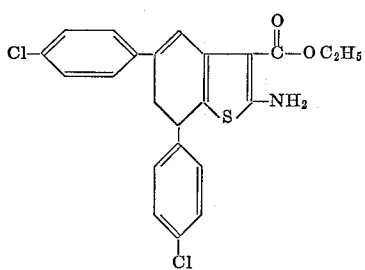

crystallizes. It is filtered with suction and recrystallized from n-butyl alcohol. Melting point, 164–166° C.

11 g. of this compound are heated at 180° C. for 8 hours under nitrogen together with 25 ml. of formamide. First, the substance dissolves, then the product precipitates and is recrystallized from aqueous dimethylformamide. 4-hydroxy-6,8-bis-(para-chlorophenyl)-[1]benzothieno[2,3-d]pyrimidine melts at a temperature above 300° C.

13 g. of this compound are suspended in 40 ml. of phosphorus oxychloride, 2 g. of triethylamine are added at room temperature, and the mixture refluxed for 1 hour. The excess phosphorus oxychloride is distilled off, the residue dissolved in methylene chloride and the resulting solution stirred into ice-water containing ammonia. The organic phase is separated, dried and evaporated. The residue is recrystallized from dimethylformamide. 4-chloro-6,8-bis-(para-chlorophenyl) - [1]benzothieno[2,3-d]pyrimidine melts at 237–238° C.

Example 9

8.3 g. of 4-chloro-6,8-bis-(para-chlorophenyl)-[1]benzothieno[2,3-d]pyrimidine and 25 ml. of β-diethylaminoethylamine are heated together at 140° C. for one hour. The excess amine is then distilled off, the crystalline residue suspended in water, filtered with suction, and recrystallized from dimethylformamide. 4-(β-diethylaminoethylamino)-6,8-bis - (para-chlorophenyl) - [1]benzothieno[2,3-d]pyrimidine of the formula

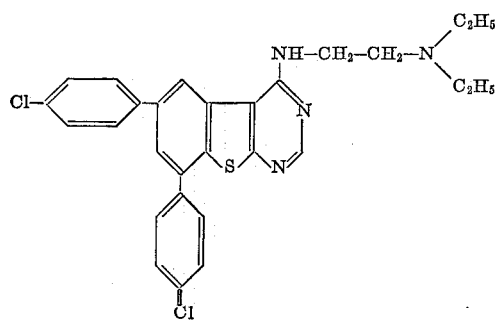

melts at 162–163° C.

Example 10

4.9 g. of 4-chloro-6,8-phenyl-(para-chlorophenyl)-5,6,7,8-tetrahydro - [1]benzothieno[2,3-d]pyrimidine and 30 ml. of γ-dimethylaminopropylamine are heated together at 140° C. for 1 hour. The excess amine is distilled off under reduced pressure, the residue digested with water, filtered with suction, and recrystallized from ethanol. The resulting 4-(γ-dimethylaminopropylamino)-6,8-phenyl-(para - chlorophenyl) - 5,6,7,8-tetrahydro[1]enzothieno[2,3-d]pyrimidine melts at 159–161° C.

The 4-chloro-6,8-phenyl - (para-chlorophenyl)-5,6,7,8-tetrahydro-[1]benzothieno[2,3-d]pyrimidine used as starting material can be prepared as follows:

320 g. of para-chlorobenzal-acetophenone and 235 g. of ethyl acetoacetate are condensed in 800 ml. of ethanol with the aid of 30.5 g. of sodium by boiling for 8 hours to form 1-phenyl-3-oxo-4-carbethoxy-5-(para-chlorophenyl)-cyclohexene(1). Melting point, 128–129°

270 g. of this compound are boiled at 160° C. for 4 hours with 1.1 litres of 2 N-hydrochloric acid, hydrolysis and decarboxylation taking place and 1-phenyl-3-oxo-5-(para-chlorophenyl)-cyclohexene-(1) being formed. Melting point, 95–96° C. (after recrystallization from ethanol).

8.43 g. of this cyclohexenone are dissolved in 100 ml. of dioxan and hydrogenated with 2.5 g. of Rupe nickel at 40° C. The dioxan is distilled off and 1-phenyl-5-(para-chlorophenyl)-cyclohexanone-(3) recrystallized from methanol. Melting point, 82–84° C.

14 g. of this compound are suspended in 50 ml. of ethanol together with 5.96 g. of ethyl cyanoacetate and 1.6 g. of sulfur. 5 ml. of morpholine are added dropwise and the mixture stirred at 40° C. for 4 hours during which complete dissolution occurs. On cooling, 2-amino-3-carbethoxy-5,7-phenyl - (para-chlorophenyl)-4,5,6,7-tetrahydro-benzo[b]thiophene crystallizes out. It is filtered off with suction and recrystallized from aqueous ethanol. Melting point, 147–149° C.

12 g. of this compound are heated at 180° C. for 6 hours under nitrogen together with 50 ml. of formamide. At first the reaction mass passes into solution, after a short while the solution becomes paler and towards the end of the reaction, 4-hydroxy-6,8-phenyl-(para-chlorophenyl)-5,6,7,8 - tetrahydro[1]benzothieno[2,3-d]pyrimidine precipitates. Melting point, 120–125° C.

12 g. of this compound are suspended in 50 ml. of phosphorus oxychloride, and 2.3 g. of triethylamine are added at room temperature and the mixture refluxed for 1 hour. The excess phosphorus oxychloride is distilled off, the residue dissolved in methylene chloride and the resulting solution stirred into ice water containing ammonia. The organic phase is separated, dried and evaporated. The residue is chromatographed on alumina. Elution with methylene chloride yields 4-chloro-6,8-phenyl-(para-chlorophenyl)-5,6,7,8 - tetrahydro-benzothieno[2,3-d]pyrimidine. Melting point, 142–144° C.

Example 11

9 g. of 4-chloro-6,8-phenyl-(para-chlorophenyl)-5,6,7,8-tetrahydro-[1]benzothieno[2,3-d]pyrimidine and 50 ml. of β-dimethylaminoethylamine are heated together at 140° C. for 1 hour. The excess amine is distilled off under reduced pressure and the residue digested with water, filtered with suction, and dried. The product is dissolved in ethanol, and a 10% solution of hydrogen chloride in ethanol is added. On addition of ether+ethyl acetate the dihydrochloride precipitates. The resulting 4-(β-dimethylamino-ethylamino) - 6,8-phenyl-(para-chlorophenyl)-5,6,7,8-tetrahydro - [1]benzothieno[2,3-d]pyrimidine-dihydrochloride melts at 175–178° C. (with decomposition).

Example 12

7.3 g. of 4-chloro-7,7-diphenyl-5,6,7,8-tetrahydro-[1]benzothieno[2,3-d]pyrimidine and 40 ml. of γ-dimethylaminopropylamine are heated together at 140° C. for 1 hour. The excess amine is distilled off under reduced pressure, the crystalline residue suspended in water, filtered with suction, and recrystallized from ethanol. The resulting 4-(γ-dimethylaminopropylamino)-7,7-diphenyl-5,6,7,8-tetrahydro - [1]benzothieno[2,3-d]pyrimidine of the formula

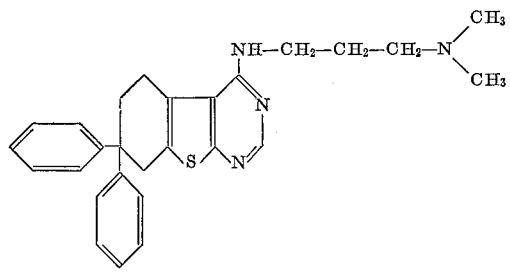

melts at 192–193° C.

The 4-chloro - 7,7-diphenyl - 5,6,7,8 - tetrahydro[1]benzothieno[2,3-d]pyrimidine used as starting material can be prepared as follows:

25 g. of 4,4-diphenyl-cyclohexanone are suspended in 80 ml. of ethanol together with 11.3 g. of ethyl cyanoacetate and 3.2 g. of sulfur. 10 ml. of morpholine are added dropwise and the mixture stirred at 40° C. for 4 hours, everything passing into solution. On cooling, 2-amino-3-carbethoxy-6,6 - diphenyl - 4,5,6,7 - tetrahydro-benzo[b]thiophene crystallizes. After being recrystallized from ethanol it melts at 172–173° C.

25 g. of this compound are heated at 180° C. under nitrogen for 6 hours with 100 ml. of formamide. Towards the end of the reaction, 4-hydroxy-7,7-diphenyl-5,6,7,8 - tetrahydro - [1]benzothieno[2,3-d]pyrimidine precipitates. Melting point, above 300° C.

18 g. of 4-hydroxy - 7,7 - diphenyl-5,6,7,8-tetrahydro-[1]benzothieno[2,3-d]pyrimidine are suspended in 50 ml. of phosphorus oxychloride, and after the addition at room temperature of 4 g. of triethylamine, the mixture is refluxed for 1 hour. The excess phosphorus oxychloride is distilled off, the residue dissolved in methylene chloride, and the solution stirred into ice-water containing ammonia. The organic phase is separated, dried and evaporated. The crystalline residue is triturated with methanol and filtered with suction. The resulting 4-chloro - 7,7 - diphenyl - 5,6,7,8 - tetrahydro[1]benzothieno[2,3-d]pyrimidine melt at 158–160° C.

Example 13

9 g. of 4-chloro - 7,7 - diphenyl - 5,6,7,8-tetrahydro-[1]benzothieno[2,3-d]pyrimidine and 40 ml. of β-dimethylaminoethylamine are heated together at 140° C. for 1 hour. The excess amine is distilled off under reduced pressure. The residue is chromatographed on alumina. Elution with methylene chloride yields 4-(β-dimethylaminoethylamino) - 7,7 - diphenyl - 5,6,7,8-tetrahydro[1]benzothieno[2,3-d]pyrimidine of the formula

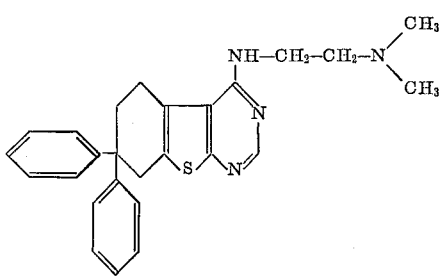

which melts at 151–153° C.

Example 14

9 g. of 4-chloro - 7,7 - diphenyl - 5,6,7,8 - tetrahydro-[1]benzothieno[2,3-d]pyrimidine and 40 ml. of β-diethylaminoethylamine are heated at 160° C. for 1 hour. The excess amine is distilled off under reduced pressure. The residue is dissolved in ethanol, and a 10% ethanolic solution of hydrogen chloride is added, whereupon 4-(β-diethylaminoethylamino) - 7,7 - diphenyl - 5,6,7,8-tetrahydro - [1]benzothieno[2,3-d]pyrimidine dihydrochloride of the formula

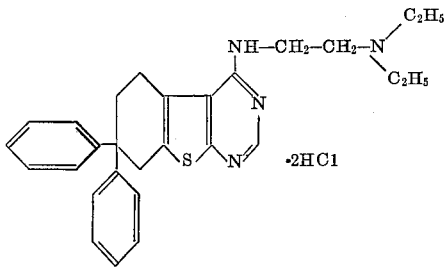

precipitates. It melts at 267–269° C.

Example 15

8 g. of 4-chloro - 7,7-bis-(para-chlorophenyl)-5,6,7,8-tetrahydro-[1]benzothieno[2,3-d]pyrimidine and 30 ml. of β-dimethylaminoethylamine are heated together at 140° C. for 1 hour. The excess amine is distilled off under reduced pressure. The residue is triturated with water, filtered with suction, and recrystallized from ethanol. The resulting 4-(β-dimethylaminoethylamino) - 7,7-bis- (para-chlorophenyl) - 5,6,7,8 - tetrahydro - [1]benzothieno[2,3-d]pyrimidine of the formula

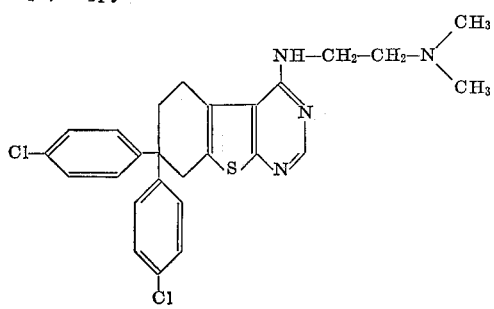

melts at 189–190° C.

The 4 - chloro - 7,7-bis-(para-chlorophenyl) - 5,6,7,8-tetrahydro[1]benzothieno[2,3-d]pyrimidine used as starting material can be prepared as follows:

48 g. of 4,4 - bis-(para-chlorophenyl)-cyclohexanone are suspended in 120 ml. of ethanol together with 17 g. of ethyl cyanoacetate and 4.8 g. of sulfur. 15 ml. of morpholine are added dropwise and the mixture is stirred at 40° C. for 4 hours, everything passing into solution. On cooling, the 2-amino-3-carbethoxy - 6,6 - bis-(para-chlorophenyl) - 4,5,6,7 - tetrahydro-benzo[b]thiophene crystallizes. After recrystallization from ethanol it melts at 206–207° C.

25 g. of this compound are heated at 180° for 6 hours under nitrogen with 100 ml. of formamide. Towards the end of the reaction, 4-hydroxy-7,7-bis-(para-chlorophenyl) - 5,6,7,8 - tetrahydro - [1]benzothieno[2,3-d] pyrimidine precipitates. Melting point, 183–185° C.

25 g. of this compound are suspended in 100 ml. of phosphorus oxychloride, 4.6 g. of triethylamine are added at room temperature, and the mixture is refluxed for 1 hour. The excess phosphorus oxychloride is distilled off, the residue dissolved in methylene chloride, and the resulting solution stirred into ice-water containing ammonia. The organic phase is separated, dried and evaporated. The oily residue is chromatographed over alumina. Elution with methylene chloride gives 4-chloro-7,7-bis-(para-chlorophenyl) - 5,6,7,8 - tetrahydro - [1]benzothieno[2,3-d]pyrimidine which melts at 190–191° C.

Example 16

6 g. of 4 - chloro - 7,7 - bis-(para-chlorophenyl)-5,6,7,8 - tetrahydro - [1]benzothieno[2,3-d]pyrimidine and 30 ml. of β-diethylaminoethylamine are heated together at 140° C. for 1 hour. The excess amine is distilled off under reduced pressure. The residue is triturated with water, filtered with suction, and recrystallized from ethanol. The resulting 4 - (β-diethylaminoethylamino)-7,7 - bis-(para-chlorophenyl) - 5,6,7,8 - tetrahydro[1]benzothieno[2,3-d]pyrimidine of the formula

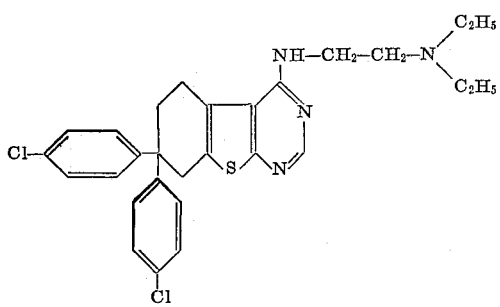

melts at 217–218° C.

Example 17

15.8 g. of 1,5-bis-(para-chlorophenyl)-cyclohexenone-(3) are suspended in 80 ml. of ethanol together with 3.3 g. of malodinitrile and 1.6 g. of sulfur, 5 ml. of morpholine are added dropwise and the mixture stirred at 40° C. for 4 hours, all passing into solution. On cooling, 2-amino-3-cyano - 5,7 - bis - (parachlorophenyl)-6,7-dihydrobenzo[b]thiophene of the formula

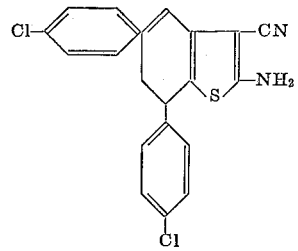

crystallizes. It is filtered with suction and recrystallized from aqueous dimethylformamide. Melting point, 174–175° C. (145° C.).

Example 18

12.5 g. of 4,4-diphenyl-cyclohexanone are suspended in 50 ml. of ethanol together with 4.2 g. of cyanacetamide and 1.6 g. of sulfur. 5 ml. of morpholine are added dropwise and the mixture stirred at 40° C. for 6 hours during which everything into solution. On coling, 2-amino-3-carbamyl - 6,6-diphenyl-4,5,6,7-tetrahydro-benzo[b]thiophene of the formula

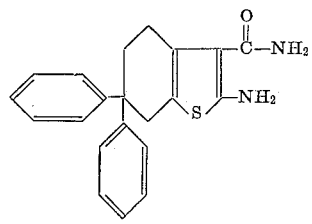

crystallizes. After being recrystallized from n-butyl alcohol it melts at 230° C.

Example 19

28.5 g. of 1-phenyl-5-(para-chlorophenyl)-cyclohexanone-(3) are suspended in 80 ml. of ethanol together with 8.4 g. of cyanacetamide and 3.2 g. of sulfur. 10 ml. of morpholine are added dropwise and the mixture stirred for 4 hours at 40° C., everything passing into solution. On cooling, 2 - amino - 3-carbamyl-5-(para-chlorophenyl)-7-phenyl-4,5,6,7-tetrahydro-benzo[b]thiophene crystallizes. After recrystallization from dimethylformamide+water it melts at 195–197° C.

Example 20

Tablets, each containing 100 mg. of the active substance, can be prepared, for example, from the following ingredients:

Composition: Per tablet, mg.
4 - (β - dimethylaminoethylamino) - 6,8 - bis-(para - chlorophenyl) - 5,6,7,8 - tetrahydro-[1]benzothieno[2,3 - d]pyrimidine dihydrochloride _____ 100
Lactose _____ 50
Wheat starch _____ 74
Colloidal silicic acid _____ 13
Talc _____ 12
Magnesium stearate _____ 1
                                                                          250

Preparation.—4 - (β - dimethylaminoethylamino)-6,8-bis - (para - chlorophenyl)-5,6,7,8-tetrahydro-[1]benzothieno[2,3-d]-pyrimidine dihydrochloride is mixed with the lactose, part of the wheat starch and with colloidal silicic acid, and the mixture forced through a sieve. Another portion of the wheat starch is pasted on a water bath with five times its quantity of water, and the powder mixture kneaded with the resulting paste until a slightly plastic mass is obtained. This mass is pressed through an approx. 3 mm. mesh sieve, dried and the resulting dry granulate passed through a sieve. The remainder of the wheat starch, the talc and the magnesium stearate are then admixed and the resulting mixture compressed into scored tablets each weighing 250 mg.

Tablets of this kind are suitable especially for therapeutic application.

Example 21

Tablets, each containing 10 mg. of active principal, can be prepared, for example, from the following ingredients:

| Composition: | Per tablet, mg. |
|---|---|
| 4 - ($\beta$ - dimethylaminoethylamino) - 6,8-bis-(para - chlorophenyl)-5,6,7,8-tetrahydro-[1]benzothieno[2,3 - d]pyrimidine dihydrochloride | 10.0 |
| Wheat starch | 29.5 |
| Lactose | 50.0 |
| Colloidal silicic acid | 5.0 |
| Talc | 5.0 |
| Magnesium stearate | 0.5 |
| | 100.0 |

Preparation.—4 - ($\beta$ - dimethylaminoethylamino)-6,8-bis - (para - chlorophenyl)-5,6,7,8-tetrahydro[1]benzothieno[2,3-d]pyrimidine dihydrochloride is mixed with part of the wheat starch, with lactose, and with colloidal silicic acid, and the mixture forced through a sieve. Another portion of the wheat starch is pasted on a water bath with five times its quantity of water, and the powder mixture kneaded with the resulting past until a slightly plastic mass is obtained. This mass is pressed through an approx. 3 mm. mesh sieve, dried, and the resulting dry granulate passed through a sieve. The remainder of the wheat starch, the talc and the magnesium stearate are then admixed and the resulting mixture compressed into tablets each weighing 100 mg.

Example 22

According to the methods described herein, e.g. in an analogous manner to that described in Examples, 1 to 16, the following compounds can be prepared:

4-($\beta$-dimethylaminoethylamino)-6,8-bis-(para-fluorophenyl)-5,6,7,8-tetrahydro-[1]benzothieno[2,3-d]pyrimidine, 4-($\beta$-dimethylaminoethylamino)-6,8-bis-(para-bromophenyl)-5,6,7,8-tetrahydro-[1]benzothieno[2,3-d]pyrimidine, 4-($\beta$-diallylaminoethylamino)-2-ethyl-5-methyl-7-(2,4-dichlorophenyl)-5,6,7,8-tetrahydro-[1]benzothieno[2,3-d]pyrimidine, 4-($\delta$-pyrrolidinobutylamino)-2-cyclohexyl-5-methyl-6,8-bis-(ortho-tolyl)-5,6,7,8-tetrahydro-[1]benzothieno[2,3-d]pyrimidine, 4-$\epsilon$-piperidinopentylamino)-2-(cyclopentylmethyl)-5-phenethyl-6-bis-(meta-ethoxyphenyl)-5,6,7,8-tetrahydro-[1]benzothieno[2,3-d]pyrimidine, 4-[$\gamma$-(N'-methylpiperazino)-propylamino]-5-(para-trifluoromethylphenyl)-7,7-dimethyl-5,6,7,8-tetrahydro-[1]benzothieno[2,3-d]pyrimidine, 4-[$\beta$-(N'-$\beta$-hydroxyethylpiperazino)-ethylamino]-2-allyl-5-(para-hydroxyphenethyl)-6,8-bis-(para-nitrophenyl)-5,6,7,8-tetrahydro-[1]benzothieno[2,3-d]pyrimidine, 4-[N-($\beta$-ethylaminoethyl)-ethylamino]-2-(4-methylcycloheptyl)-6,8-bis-(meta-acetylaminophenyl)-5,6,7,8-tetrahydro-[1]benzothieno[2,3]pyrimidine, 4-[$\beta$-(3-methyl-1,2,5,6-tetrahydro-1-pyridyl)-ethylamino]-2-(3-methyl-cyclopentylmethyl)-5-(orthobenzoyloxy-phenyl)-7,7-bis-(ortho-aminophenylpropyl)-5,6,7,8-tetrahydro-[1]benzothieno[2,3-d]pyrimidine, 4-($\beta$-diethylaminopropyl)-2-(ortho-acetoxy-benzyl)-5-(metatrifluoromethylphenyl)-7,7-bis-(ortho-acetoxybenzyl)-5,6,7,8-tetrahydro-[1]benzothieno[2,3,-d]pyrimidine, 4-($\beta$-dimethylaminoethylamino)-6,8-(3,4-methylenedioxyphenyl)-5,6,7,8-tetrahydro-[1]benzothieno[2,3-d]pyrimidine, and 4-($\beta$-diethylaminoethylamino)-2-ethyl-6,8-bis-(3,4,5-trimethoxyphenyl)-5,6,7,8-tetrahydro-[1]benzothieno[2,3-d]pyrimidine.

Example 23

In an analogous manner to that described in Examples 17 to 19, there may be prepared the 2-amino-3-carbamyl-5,7 - bis-(para-chlorophenyl)-4,5,6,7-tetrahydrobenzo[b]thiophene.

We claim:

1. A member selected from the group consisting of compounds of the formula

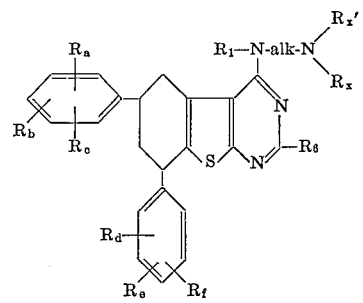

in which $R_x$ and $R_x'$ each stands for a member selected from the group consisting of hydrogen and lower alkyl and, when taken together with the nitrogen atom, for a member selected from the group consisting of pyrrolidino, piperidino, C-lower alkylated pyrrolidino, C-lower alkylated piperidino, $\beta$-monounsaturated pyrrolidino, $\beta$-monounsaturated piperidino, $\beta$-monounsaturated C-lower alkylated pyrrolidino, $\beta$-monounsaturated C-lower alkylated piperidino, N'-lower alkyl piperazino, N'-(hydroxy-lower alkyl)-piperazino, thiomorpholino, morpholino, C-lower alkylated N'-lower alkyl-piperazino, C-lower alkylated N'-(hydroxy-lower alkyl)-piperazino, C-lower alkylated thiomorpholino, C-lower alkylated morpholino, piperazino and C-lower alkylated piperazino, $R_1$ and $R_6$ each stands for a member selected from the group consisting of hydrogen and lower alkyl and $R_a$, $R_b$, $R_c$, $R_d$, $R_e$ and $R_f$ each represents a member selected from the group consisting of hydrogen, lower alkyl, lower alkoxy, halogen and trifluoromethyl, and therapeutically acceptable acid addition salts thereof.

2. A product as claimed in claim 1, in which $R_1$ stands for hydrogen and

for di-lower alkylamino-lower alkyl.

3. A product as claimed in claim 2, in which $R_6$ stands for hydrogen, $R_a$, $R_c$, $R_d$ and $R_f$ each stands for hydrogen, $R_b$ and $R_e$ each stands for a member selected from the group consisting of para-fluoro, para-chloro and para-bromo and

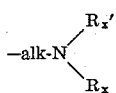

for a member selected from the group consisting of $\beta$-di-lower alkylamino-ethyl and $\gamma$-di-lower alkylamino-propyl.

4. A product as claimed in claim 1, which is a member selected from the group consisting of compounds of the formula

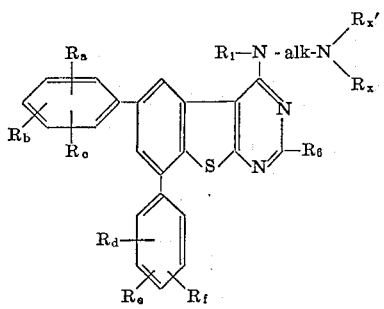

in which $R_x$ and $R_x'$ each stands for a member selected from the group consisting of hydrogen and lower alkyl and, when taken together with the nitrogen atom, for a member selected from the group consisting of pyrrolidino, piperidino, C-lower alkylated pyrrolidino, C-lower alkylated piperidino, $\beta$-monounsaturated pyrrolidino, $\beta$-monounsaturated piperidino, $\beta$ - monounsaturated C-lower alkylated pyrrolidino, $\beta$-monounsaturated C-lower alkylated piperidino, N'-lower alkyl piperazino, N'-(hydroxy-lower alkyl)-piperazino, thiomorpholino, morpholino, C-lower alkylated N'-lower alkylpiperazino, C-lower alkylated N'-(hydroxy-lower alkyl)-piperazino, C-lower alkylated thiomorpholino, C-lower alkylated morpholino, piperazino and C-lower alkylated piperazino, $R_1$ and $R_6$ each stands for a member selected from the group consisting of hydrogen and lower alkyl and $R_a$, $R_b$, $R_c$, $R_d$, $R_e$ and $R_f$ each represents a member selected from the group consisting of hydrogen, lower alkyl, lower alkoxy, halogen and trifluoromethyl, and therapeutically acceptable acid addition salts thereof.

5. A product as claimed in claim 4, in which $R_1$ and $R_6$ each stands for hydrogen, $R_a$, $R_c$, $R_d$ and $R_f$ each stands for hydrogen, $R_b$ and $R_e$ each stands for a member selected from the group consisting of para-fluoro, para-chloro and para-bromo and

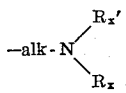

for a member selected from the group consisting of $\beta$-di-lower alkylamino-ethyl and $\gamma$-di-lower alkylaminopropyl.

6. A product as claimed in claim 1, which is a member selected from the group consisting of compounds of the formula

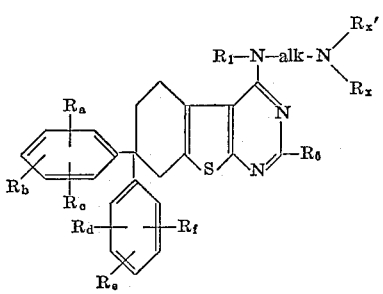

in which $R_x$ and $R_x'$ each stands for a member selected from the group consisting of hydrogen and lower alkyl and, when taken together with the nitrogen atom, for a member selected from the group consisting of pyrrolidino, piperidino, C-lower alkylated pyrrolidino, C-lower alkylated piperidino, $\beta$-monounsaturated pyrrolidino, $\beta$-monounsaturated piperidino, $\beta$-monounsaturated C-lower alkylated pyrrolidino, $\beta$-monounsaturated C-lower alkylated piperidino, N'-lower alkyl piperazino, N'-(hydroxy-lower alkyl)-piperazino, thiomorpholino, morpholino, C-lower alkylated N'-lower alkyl-piperazino, C-lower alkylated N'-(hydroxy-lower alkyl)-piperazino, C-lower alkylated thiomorpholino, C-lower alkylated morpholino, piperazino and C-lower alkylated piperazino, $R_1$ and $R_6$ each stands for a member selected from the group consisting of hydrogen and lower alkyl and $R_a$, $R_b$, $R_c$, $R_d$, $R_e$ and $R_f$ each represents a member selected from the group consisting of hydrogen, lower alkyl, lower alkoxy, halogen and trifluoromethyl, and therapeutically acceptable acid addition salts thereof.

7. A product as claimed in claim 6, in which $R_1$ and $R_6$ each stands for hydrogen, $R_a$, $R_c$, $R_d$ and $R_f$ each stands for hydrogen, $R_b$ and $R_e$ each stands for a member selected from the group consisting of para-fluoro, para-chloro and para-bromo and

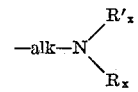

for a member selected from the group consisting of $\beta$-di-lower alkylamino-ethyl and $\gamma$-di-lower alkylaminopropyl.

8. A product as claimed in claim 4, in whih $R_1$, $R_6$, $R_a$, $R_c$, $R_d$ and $R_f$ each stands for hydrogen, $R_b$ and $R_e$ each stands for para-chloro and

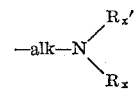

for a member selected from the group consisting of $\beta$-dimethylaminoethyl and $\beta$-diethylaminoethyl.

9. A product as claimed in claim 6, in which $R_1$, $R_6$, $R_a$, $R_c$, $R_d$ and $R_f$ each stands for hydrogen, $R_b$ and $R_e$ are identical and stand for members selected from the group of hydrogen and para-chloro and

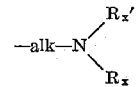

stands for a member selected from the group consisting of $\gamma$ - dimethylaminopropyl, $\beta$-diethylaminoethyl and $\beta$-dimethylaminoethyl.

10. A product as claimed in claim 1, wherein $R_1$, $R_6$, $R_a$, $R_b$, $R_c$, $R_d$, $R_e$ and $R_f$ each stands for hydrogen and

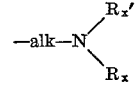

for a member selected from the group consisting of $\beta$-diethylaminoethyl, $\gamma$ - dimethylaminopropyl, 4 - diethylamino-1-methylbutyl and $\beta$-morpholinoethyl.

11. A product as claimed in claim 1, wherein $R_1$, $R_6$, $R_a$, $R_c$, $R_d$ and $R_f$ each stands for hydrogen, one of the symbols $R_b$ and $R_e$ stands for para-chloro and the other for hydrogen and

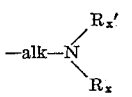

for $\gamma$-dimethylaminopropyl and $\beta$-dimethylaminoethyl.

12. A product as claimed in claim 1, which is the 4-($\beta$-diethylaminoethylamino) - 6,8-bis(para-chlorophenyl)-5,6-7,8 - tetrahydro-[1]benzothieno[2,3-d]pyrimidine or therapeutically acceptable acid addition salt thereof.

13. A product as claimed in claim 1, which is the 4-(β-dimethylaminoethylamino) - 6,8-bis-(para-chlorophenyl)-5,6,7,8 - tetrahydro-[1]benzothieno[2,3-d]pyrimidine or therapeutically acceptable acid addition salt thereof.

14. A product as claimed in claim 1, which is the 4-(γ-dimethylaminopropylamino) - 6,8 - bis-(para-chlorophenyl)-5,6,7,8 - tetrahydro - [1]benzothieno[2,3-d]pyrimidine or therapeutically acceptable acid addition salt thereof.

References Cited

Sauter: Monatsh. Chem., 1968, 99(5), 2100–6.

ALEX MAZEL, Primary Examiner

R. J. GALLAGHER, Assistant Examiner

U.S. Cl. X.R.

260—243 B, 247.1, 329 F, 332.2 C, 332.3 R, 332.5, 251 A; 424—200, 232, 246, 248, 251